United States Patent [19]
Falzon

[11] Patent Number: 5,769,490
[45] Date of Patent: Jun. 23, 1998

[54] ADJUSTABLE LUMBAR SUPPORT

[75] Inventor: Mark F. Falzon, Lara, Australia

[73] Assignee: Henderson's Industries Pty. Ltd., Australia

[21] Appl. No.: 648,030

[22] PCT Filed: Dec. 23, 1994

[86] PCT No.: PCT/AU94/00790

§ 371 Date: May 20, 1996

§ 102(e) Date: May 20, 1996

[87] PCT Pub. No.: WO95/17840

PCT Pub. Date: Jul. 6, 1995

[30] Foreign Application Priority Data

Dec. 24, 1993 [AU] Australia ................ PM 3146

[51] Int. Cl.⁶ .................. A47C 3/027; A47C 7/46
[52] U.S. Cl. .................... 297/284.4; 297/284.8; 297/284.3; 297/452.3
[58] Field of Search ............... 297/284.4, 284.3, 297/284.7, 284.8, 452.3

[56] References Cited

U.S. PATENT DOCUMENTS

| | | | |
|---|---|---|---|
| 3,106,423 | 10/1963 | Schwarz | 297/284.4 |
| 3,241,879 | 3/1966 | Castello et al. | 297/284.4 |
| 3,948,558 | 4/1976 | Obermeier et al. | |
| 4,155,592 | 5/1979 | Tsuda et al. | |
| 4,531,779 | 7/1985 | Hashimoto | |
| 4,565,406 | 1/1986 | Suzuki | 297/284.4 |
| 4,840,425 | 6/1989 | Noble | |
| 5,462,335 | 10/1995 | Seyler | 297/284.4 |
| 5,553,919 | 9/1996 | Dennis | 297/284.8 |

FOREIGN PATENT DOCUMENTS

| | | | |
|---|---|---|---|
| 78335/87 | 3/1988 | Australia . | |
| 1077189 | 7/1967 | United Kingdom | 297/284.4 |
| 94/08492 | 4/1994 | WIPO | 297/284.4 |

Primary Examiner—Peter M. Cuomo
Assistant Examiner—Rodney B. White
Attorney, Agent, or Firm—Lerner, David, Littenberg, Krumholz & Mentlik

[57] ABSTRACT

An adjustable lumbar support of the kind including a flexible band which in use extends transverse of a seat backrest. The lumbar support has means for adjusting the rearward curvature of the band in a fore and aft direction and also has means for adjusting the relative effective lengths of the upper and lower regions of the band. An intermediate portion of the band is made up of a number of interconnected segments, and the location of the connection between adjacent segments may alternate between the upper and lower regions of the band. A flexible frame is connected to the band to support the band and associated components such as the adjusting means actuators, in a configuration such as to permit convenient attachment of the band assembly to a seat backrest. The frame can also function as biasing means such as to bias the band towards a condition of minimum rearward curvature.

33 Claims, 7 Drawing Sheets

ADJUSTABLE LUMBAR SUPPORT

This invention relates to lumbar supports for use in the back rest of seats, chairs and the like. The invention is specially suited for use with vehicle seats, and it will be convenient to hereinafter describe the invention with particular reference to that example use. In that regard, the word "vehicle" is to be understood as embracing vehicles of all kinds including aircraft, water borne vehicles and land vehicles.

It is well known to provide adjustable lumbar supports in vehicle seats, and especially in the seat to be occupied by the vehicle driver. Such adjustable supports take a variety of forms, and the manner of achieving adjustment also varies widely. The adjustment is generally such that it varies the effective length of the support and/or its stiffness, and thereby influences the extent to which the support curves rearwards in response to pressure applied by the user of the vehicle seat. That is, the support may provide a relatively flat or deeply curved support for the vehicle seat occupant, according to the level of adjustment of the support.

Adjustment of the foregoing kind is sometimes referred to as fore and aft adjustment, which reflects the direction in which the support moves during adjustment under normal use conditions. PCT patent application AU93/00521 discloses means for achieving an additional form of adjustment which shifts the zone of primary support upwards or downwards as required. The relative terms "upwards" and "downwards" are used in the context of normal use conditions of the lumbar support. The zone of primary support is the zone extending transverse to the seat back rest along which the support structure imposes maximum resistance to rearward deflection by the pressure imposed by the occupant of the associated seat. It is therefore at the region of the seat back rest at which the seat occupant feels a variation in the degree of support as a consequence of fore or aft adjustment of the lumbar support.

The facility to effect up and down adjustment of the foregoing kind greatly enhances the benefits of an adjustable lumbar support. It permits the lumbar support to be adjusted to best suit the particular body form, in particular height, of each person who occupies the seat. Although the lumbar support disclosed by PCT application AU93/00521 satisfactorily meets that general requirement, it has been found that a person using such a lumbar support may experience a lack of consistency in the degree of support provided at the upper and lower regions respectively of the support structure.

It is an object of the present invention to provide a lumbar support which overcomes or minimizes the aforementioned problem. It is a further object of the invention to provide a seat assembly including such a lumbar support. It is yet another object of the invention to provide a lumbar support having an improved construction such as to permit substantial variation in the degree of support provided at the upper and lower regions of the support structure.

The present invention is concerned with a lumbar support of the kind including a flexible band which in use extends longitudinally across the back rest of a seat so that opposite ends of the band are adjacent respective opposite sides of the back rest. The band has upper and lower regions which extend in the longitudinal direction of the band and which are laterally spaced from one another. Each of those regions has an effective length in the longitudinal direction of the band which in use determines the depth of rearward curvature of the respective region.

A lumbar support in accordance with one aspect of the invention is characterised in that each of the upper and lower regions of the flexible band is connected to region adjusting means which is operative to shorten the effective length of a selected one of either of the regions while simultaneously permitting or causing extension of the effective length of the other non-selected region. Such an arrangement provides a positive adjustment facility for each of the two band regions and thereby ensures substantial consistency in the "feel" of the lumbar support as the zone of primary support is shifted upwards or downwards.

In a preferred arrangement, the region adjusting means includes two flexible cables, each of which is connected to a respective one of the two band regions. Each cable is also connected to an actuator which could be in the form of an electric motor or a hand operated mechanism. The two cables are so arranged that one will tend to pull on its respective band region and thereby shorten the effective length of that region as the actuator is operated in one direction, and the other will tend to pull on its respective band region when the actuator is operated in the opposite direction. It is a further feature of the arrangement that as one cable pulls on its respective band region, the other cable relaxes its influence on the band region to which it is connected and thereby allows an increase in the effective length of that other band region.

A lumbar support in accordance with another aspect of the invention is characterised in that at least portion of the band is formed of a plurality of interconnected segments which are spaced apart in the longitudinal direction of the band. A space exists between each two adjacent segments at each of the aforementioned regions, and those two spaces may have a substantially equal width when the effective length of each of the two regions is substantially the same. In that regard, the width of a space is measured in the longitudinal direction of the band. Adjacent segments are movable relative to one another about their respective interconnection so as to thereby reduce or increase the space between them at one of the regions. The arrangement is such that an increase in the spacing at one region occurs simultaneous with a decrease in the spacing at the other region. That increase and decrease may occur between the same two adjacent segments, or the increase may occur between one pair of adjacent segments and the decrease may occur between another pair. In one arrangement, the increase and decrease occurs alternately throughout the length of the series of segments with all increases being at one region of the band, and all decreases being at the other region of the band.

Adjusting means of any suitable form could be connected to the band in order to control the aforementioned relative movement of adjacent segments. In a preferred arrangement, that adjusting means is generally in accordance with the first aspect of the invention referred to above.

A lumbar support in accordance with yet another aspect of the invention is characterised in that a resilient frame is connected to the band and is operative to bias the band towards a position at which the rearward curvature of the band is at a pre-determined minimum or maximum.

A frame of the foregoing kind can be conveniently made of wire or slender metal rod. Such a frame can have a function additional to the bias function referred to above, and that is to support the lumbar assembly in a ready-to-use condition during transport and storage. Preferably, the frame flexes when the lumbar support is subjected to load during use such as to curve rearwardly to an increased extent. That flexing stresses the frame so that it adopts a return spring function when load is removed from the lumbar support and the frame thereby tends to urge the lumbar support band towards a condition of minimum rearward curvature.

An advantage of the belt arrangement described is that there is relatively free movement between the upper and lower extremities of adjacent segments. That facilitates variation in the effective length of each region of the support band and thereby increases the range of adjustment of the lumbar support. It is preferred, that each segment has a contoured outer surface, which may be a convex curved surface and is the surface facing towards the occupant of a seat incorporating the lumbar support.

Embodiments of the invention are described in detail in the following passages of the specification which refer to the accompanying drawings. The drawings, however, are merely illustrative of how the invention might be put into effect, so that the specific form and arrangement of the various features as shown is not to be understood as limiting on the invention.

It is typical for a lumbar support to be contained within the body of a seat back rest so that padding overlies the forwardly facing surface or surfaces of the lumbar support. The same type of installation may be adopted for the particular lumbar support hereinafter described.

Figure 1:
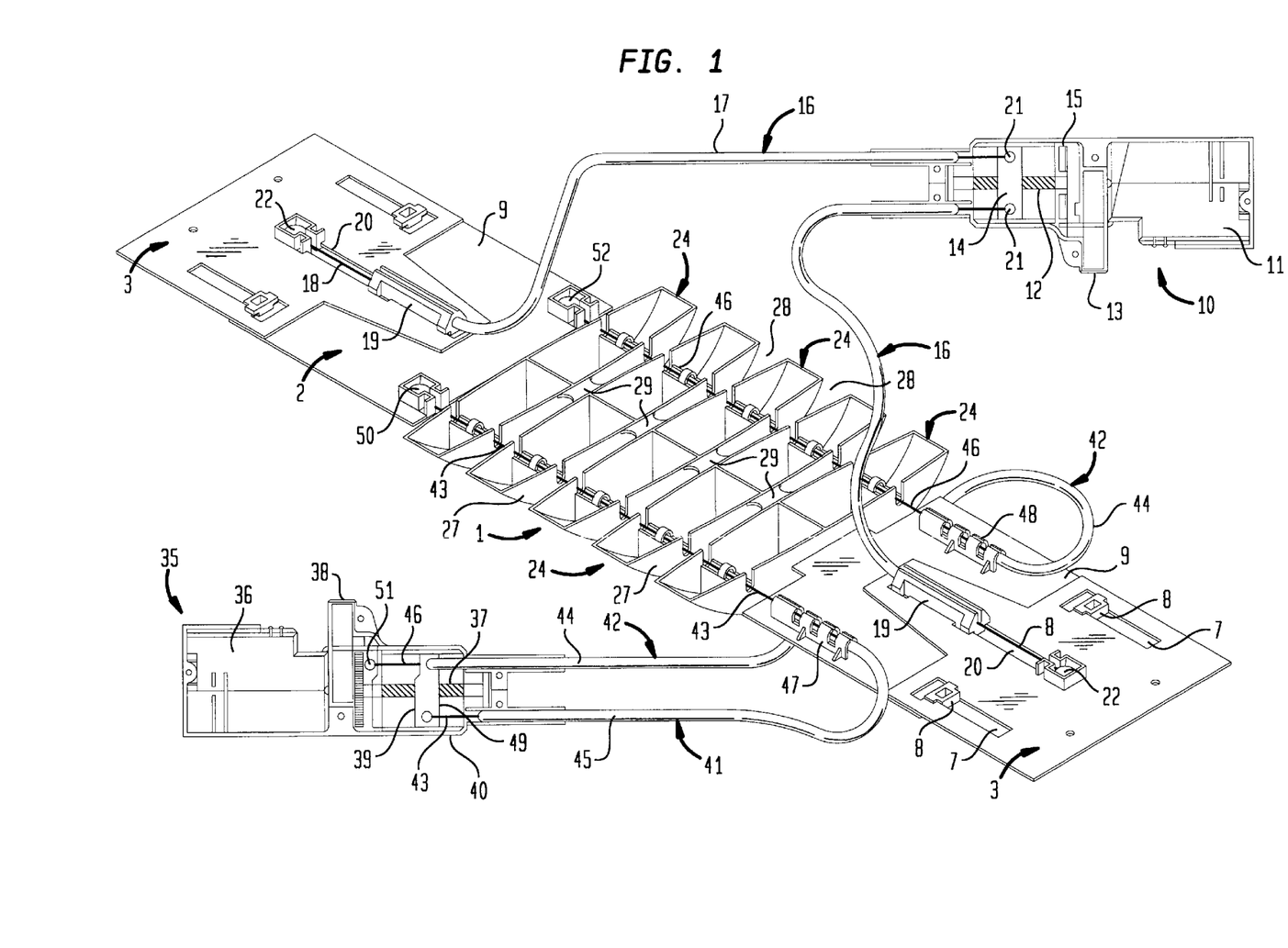
FIG. 1 is a semi-diagrammatic perspective view of a lumbar support according to one embodiment of the invention.
Figure 2:
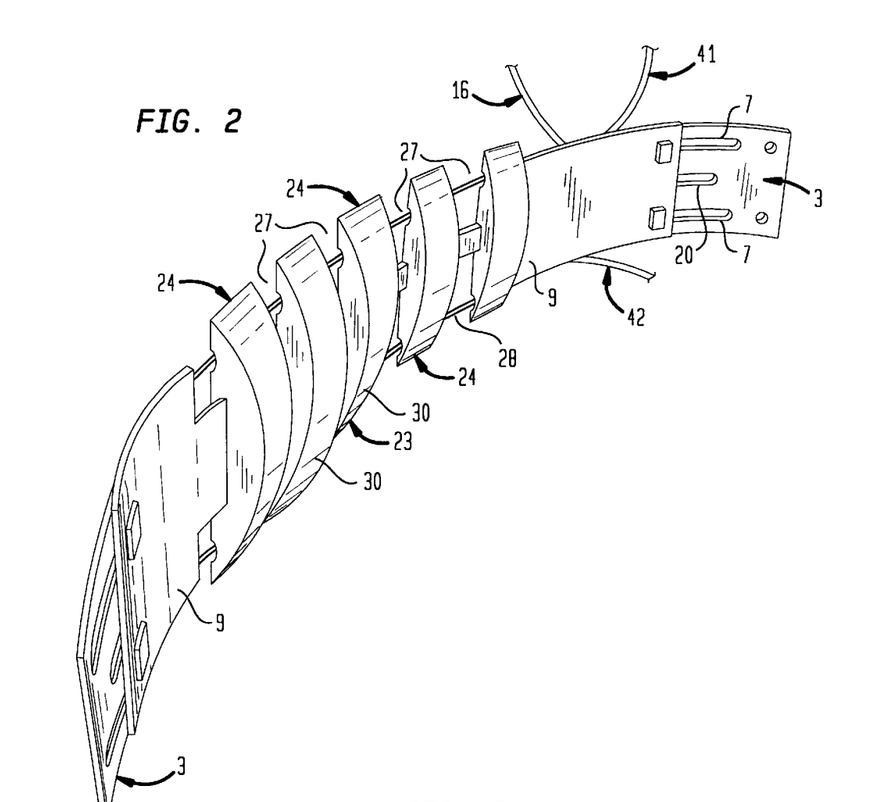
FIG. 2 is a perspective view of the band of the lumbar support of FIG. 1, showing the band from the front and in a rearwardly curved condition.

FIG. 1 shows from the rearward side, one form of lumbar support which incorporates an embodiment of the invention. The support includes a flexible band 1 which, in the arrangement shown, is made up of three separately formed parts, a body part 2 and two end mounting parts 3. As shown diagrammatically in FIG. 3, each of the mounting parts 3 is attachable to a respective side member 4 of a seat back rest frame so that the band 1 extends transversely of the seat back rest between those frame members 4.

Figure 8:
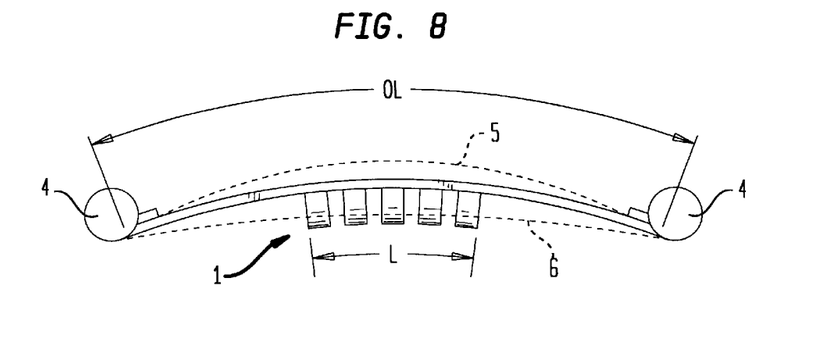
FIG. 8 is a plan view of the assembly shown in FIG. 3.

The band 1 usually has a rearward curvature when mounted for use as shown diagrammatically in the plan view forming FIG. 8. The degree of that curvature can be increased or decreased, as represented by the broken lines 5 and 6 respectively, in accordance with the needs of the seat occupant. That adjustment is sometimes referred to as the fore and aft adjustment of the lumbar support, and is the only form of adjustment which is possible with some lumbar supports.

Any suitable means may be employed to effect the fore and aft adjustment. In the particular example shown by FIG. 1, the body part 2 of the band 1 is able to move longitudinally relative to each of the mounting parts 3 and thereby vary the overall effective length OL (FIG. 8) of the band 1. In an alternative arrangement (not shown), the facility for such relative movement may be limited to only one mounting part 3. Also, an acceptable arrangement may not employ relative linear movement of the body part 2. By way of example, the reduction or extension of the effective length OL of the band could be achieved by means of partial rotation of one or more pivotable parts.

In the particular arrangement shown, the body part 2 is connected to each mounting part 3 through a slidable connection. The connection includes two laterally spaced slots 7 which are formed through the mounting part 3, and a pair of slides 8 which project from a plate-like end portion 9 of the body part 2 so that each is slidable within a respective one of the slots 7. Each slot 7 is preferably arranged to extend substantially parallel to the longitudinal direction of the band 1. It will be appreciated that other forms of slidable connection could be adopted.

Relative sliding movement of the parts 2 and 3 can be regulated in any suitable manner. In the arrangement shown, an electrically operated actuator 10 is employed, and that includes a reversible motor 11 connected to a screw threaded spindle 12 through a suitable gear box 13. A carriage 14 is mounted on the spindle 12 and is in cooperative threaded engagement with the spindle. The carriage 14 also cooperates with a housing 15 or other guide means so as to be held against rotation with the spindle 12 while nevertheless being capable of relative movement in the axial direction of the spindle 12. The arrangement is such that rotation of the spindle 12 in one direction causes the carriage 14 to move axially towards one end of the spindle 12, and rotation of the spindle 12 in the other direction causes the carriage 14 to move axially towards the other end of the spindle 12.

A drive connection is provided between the actuator 10 and each end of the band 1, and in the arrangement shown that includes two flexible cables 16. Each cable 16 is made up of a tubular sleeve 17 and a wire core 18 which is slidable axially within the sleeve. Each sleeve 17 is captured lengthwise between abutments on the actuator housing 15 and the band 1 so that the respective core 18 can be moved axially in one direction or another relative to the sleeve 17. Each band abutment may be formed, as shown, by a section 19 formed integral with or secured to a respective one of the end portions 9. That section 19 is slidably located within a slot 20 formed through the adjacent mounting part 3 and extends beyond the rearmost surface of that part 3. Each section 19 includes a passage (not shown) which receives an end portion of the respective cable sleeve 17, and the passage is arranged to permit the sleeve 17 to be attached to the section 19 from the rear side of the band 1.

The core 18 of each cable 16 has one end 21 connected to the carriage 14, and its other end 22 connected to a respective one of the mounting parts 3. The arrangement is such that movement of the carriage 14 in one direction results in both mounting parts 3 being pulled on to the body part 2 so as to reduce the effective length of the band 1. Movement of the carriage 14 in the opposite direction relaxes the cables 16 so that both mounting parts 3 can be moved relative to the body part 2 to extend the effective length of the band 1.

It will be appreciated that the arrangement particularly described above is open to substantial variation, both in terms of form and manner of operation.

Figure 3:
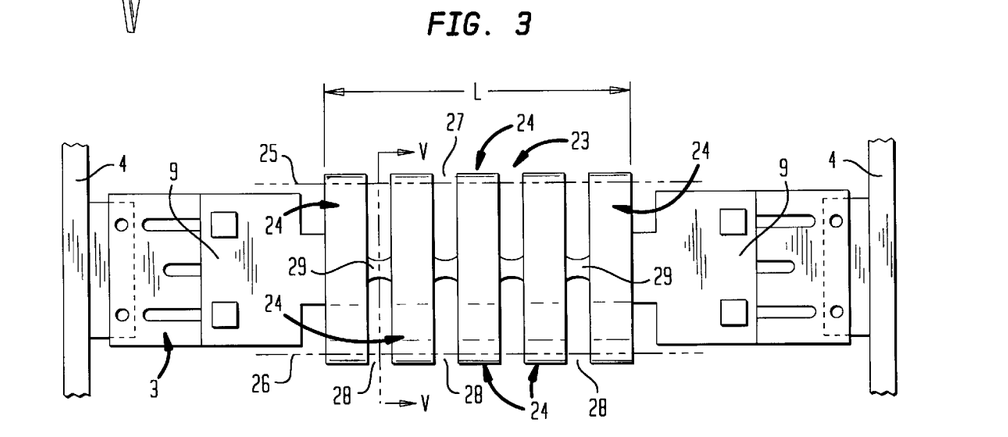
FIG. 3 is a diagrammatic illustration of the lumbar support of FIG. 2 attached to a seat backrest.

The body part 2 of the band 1 as shown is formed at two end portions 9 as previously referred to, and an intermediate portion 23 disposed between and connected to the end portions 9. It is a feature of the particular construction shown that the intermediate portion 23 is made up of a number of relatively movable segments 24, each of which extends between the upper and lower regions of the band 1. Those regions are diagrammatically represented by the lines 25 and 26 respectively in FIGS. 3 and 4 of the drawings. In the condition of the band 1 as shown in FIG. 3, a space 27 exists between each adjacent segment 24 at the region 25, and a space 28 exists between each adjacent segment 24 at the region 26.

A connection is provided between each two adjacent segments 24 so as to retain the integrity of the intermediate portion 23. In the arrangement shown, each such connection is provided by a small web 29 which is located substantially on the center line of the band 1 and has a degree of flexibility. Each web 29 could be formed integral with the segments 24 which it interconnects. In that regard, the body part 2 of the band 1 may be moulded or otherwise formed from a suitable plastics material.

The intermediate portion 23 forms a profile which functions as hereinafter described, and for that purpose each segment 24 has a contoured outer surface 30. In the particular arrangement shown, that surface 30 is a convex curved surface which projects beyond the general plane of the end portions 9 of the body part 2. A curved surface 30 is generally preferred, but is not essential to satisfactory operation of the intermediate portion 23. By way of example, each surface 30 could be formed of a plurality of flat faces arranged so that there is variation in the degree to which the surface 30 projects beyond the aforementioned general plane.

Figure 5:
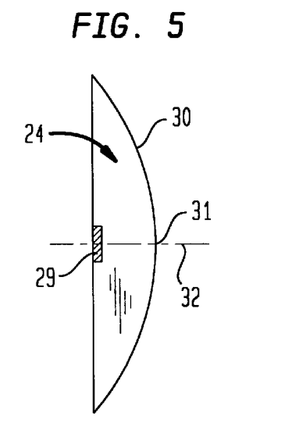
FIG. 5 is a cross-sectional view taken along line V—V of FIG. 3.

Physical spacing of the segments 24 enables the profile of the intermediate portion 23 to be easily varied to achieve up and down adjustment of the zone of primary support. In the condition of the band 1 as shown in FIG. 3, the zone of primary support 31 is located substantially midway in the height of the segments 24, and that location is represented diagrammatically by the broken line 32 in FIG. 5.

Figure 4:
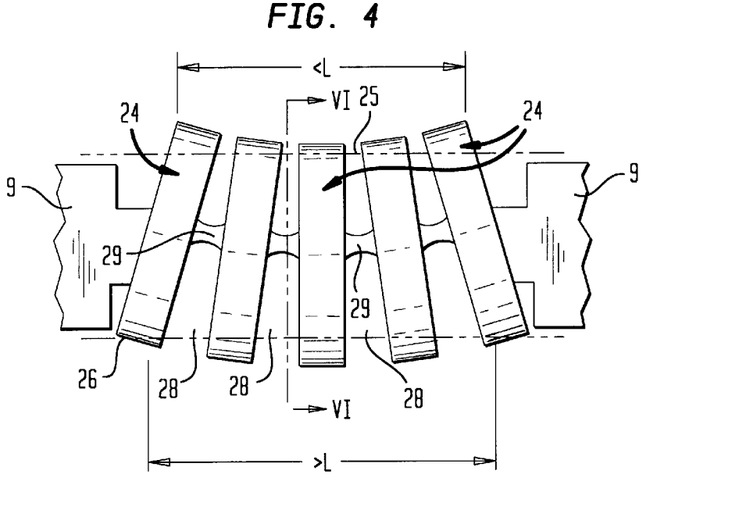
FIG. 4 is a view similar to FIG. 3 but showing relative adjustment of the effective length of the support band at the upper and lower regions of the band.

If the upper extremities of the segments 24 are squeezed together as shown in FIG. 4, the effective length of the intermediate portion 23 at the upper region 25 will change from L (FIG. 3) to something less than L. On the other hand, the effective length of the portion 23 at the region 26 will change to something greater than L. As a consequence of that change in effective lengths, the segments 24 will tend to tilt forwards as shown diagrammatically by FIG. 6, and that results in an upward shift of the primary support zone 31 to the location represented by the line 33 in FIG. 6.

Figure 7:
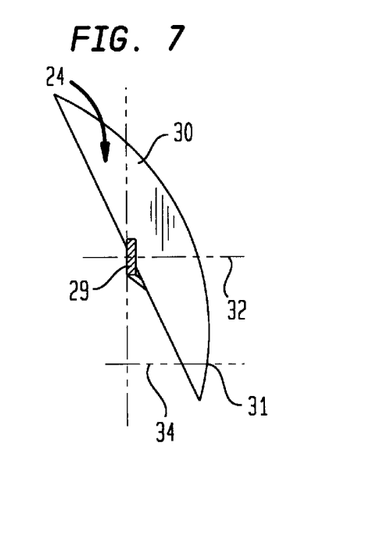
FIG. 7 is a view similar to FIG. 6 but showing adjustment of the lumbar support in the reverse direction.

If on the other hand, the lower extremities of the segments 24 are squeezed together, the primary support zone 31 will be shifted downwards to the location represented by the line 34 in FIG. 7.

Figure 6:
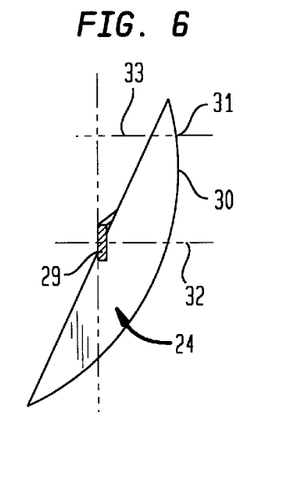
FIG. 6 is a cross-sectional view taken along line VI—VI of FIG. 4.

It will be apparent that appropriate selection of the degree to which the spaces 27 and 28 are changed either by reduction or enlargement, will enable the location of the primary support zone 31 to be moved anywhere between the two extremes represented by the lines 33 and 34. Also, that movement of the primary support zone 31 can be effected independent of any fore and aft adjustment of the lumbar support.

Any suitable means may be adopted to control changes in the effective length L (FIG. 3). In the arrangement shown, that means includes an electrically operated actuator 35 which includes a reversible motor 36 connected to a screw threaded spindle 37 through a suitable gear box 38. A carriage 39 is mounted on the spindle 37 and is in cooperative threaded engagement with that spindle. The carriage 39 also cooperates with a housing 40 or other guide means so as to be held against rotation with the spindle 37 while nevertheless being capable of relative movement in the axial direction of the spindle 37. The arrangement is such that rotation of the spindle 37 in one direction causes the carriage 39 to move axially towards one end of the spindle, and rotation of the spindle 37 in the opposite direction causes the carriage to move axially towards the other end of the spindle.

A drive connection is provided between the actuator 35 and each of the two regions 25 and 26 of the intermediate portion 23 of the band 1. In the arrangement shown, each of those connections includes a flexible cable. One cable 41 connects the region 25 to the actuator carriage 39, and another cable 42 connects the region 26 to the housing 40 or some other support which is fixed against movement with the carriage 39. Each of the cables 41 and 42 is preferably composed of a tubular sleeve and a wire core slidable axially within that sleeve.

The drive connection is arranged so that the effective length of the band 1 at either region 25 or 26 can be reduced simultaneously with an increase in the effective length of the other region. There are various arrangements for meeting that objective, and one such arrangement is shown by FIG. 1. In that example arrangement, the desired result is achieved by having the actuator carriage 39 act on the core 43 of the cable 41 and the sleeve 44 of the cable 42. Obviously, it would be equally suitable for the carriage 39 to act on the sleeve 45 of the cable 41 and the core 46 of the cable 42.

In the particular arrangement shown, the sleeve 45 of the cable 41 is captured lengthwise between the actuator housing 40 and an abutment 47 on one of the end portions 9 of the band body part 2. The sleeve 44 of the cable 42 is captured lengthwise between the actuator carriage 39 and an abutment 48 on the same end portion 9 as that which carries the abutment 47. The two abutments 47 and 48 are on the rear of the end portion 9 and each is located adjacent a respective one of the regions 25 and 26.

The core 43 of the cable 41 has one end 49 connected to the carriage 39 and its opposite end 50 connected to the end portion 9 which does not carry the abutments 47 and 48. The core 46 of the cable 42 has one end 51 connected to the actuator housing 40 or a part fixed relative thereto, and its opposite end 52 is connected to the same end portion 9 as that to which the cable end 50 is connected. The core end 51 is located on the side of the carriage 39 opposite to that which bears against the cable sleeve 44, and the carriage 39 is able to move along that part of the cable core 46 which is exposed adjacent to the core end 51.

As will be seen from FIG. 1, each cable sleeve 44 and 45 has an end located at one end portion 9 of the band body part 1, and the two cable cores 43 and 46 extend from those sleeve ends to their respective connections with the other end portion 9. A section of each cable core 43 and 46 is therefore exposed between the two end portions 9, and it is preferred that each of the segments 24 is able to move freely relative to those exposed sections, generally in the longitudinal direction of the band 1. Any appropriate means may be adopted to resist movement of the exposed core sections out of a predetermined relationship with the segments 24.

When the motor 36 is operated to turn the spindle 37 in one direction, the carriage 39 is caused to move to the right of the position shown in FIG. 1. That causes a reduction in the length of the cable core 46 exposed between the cable end 52 and the adjacent end of the cable sleeve 44. As a result, the spaces 28 between the segments 24 are reduced in width with a consequent reduction in the effective length L at the band region 26. Simultaneous with that action, the length of the cable core 43 exposed between the cable end 50 and the adjacent end of the cable sleeve 45 is extended, thereby allowing an increase in the width of the spaces 27 between the segments 24.

It will be appreciated that reverse operation of the motor 36 will cause the carriage 39 to move to the left of the position shown in FIG. 1. That will cause a reduction in the width of the spaces 27 at the region 25 and a simultaneous increase in the width of the spaces 28 at the region 26. An example of that condition of adjustment is shown by FIG. 4.

Each of the connecting webs 29 may function in the manner of a flexible or resilient hinge. As the segments 24 are moved relative to one another from the regularly spaced condition shown in FIGS. 1 and 3, the webs will tend to distort in an elastic manner. The webs 29 may be constructed so that such distortion results in the webs 29 developing internal stress which imposes a restoring force such that the webs 29 tend to return to the original non-distorted condition when the force causing the distortion is relaxed or removed. The webs 29 therefore act something in the manner of a return spring.

In any event, the webs 29 are dimensioned and located to provide a hinge or fulcrum about which adjacent segments 24 can move relative to one another as described above. In particular, it is preferred that the webs 29 be arranged and formed so as to minimise resistance to such movement of the segments 24 without sacrificing the integrity of the band body part 2. Other means could be adopted to achieve the same result.

Figure 9:
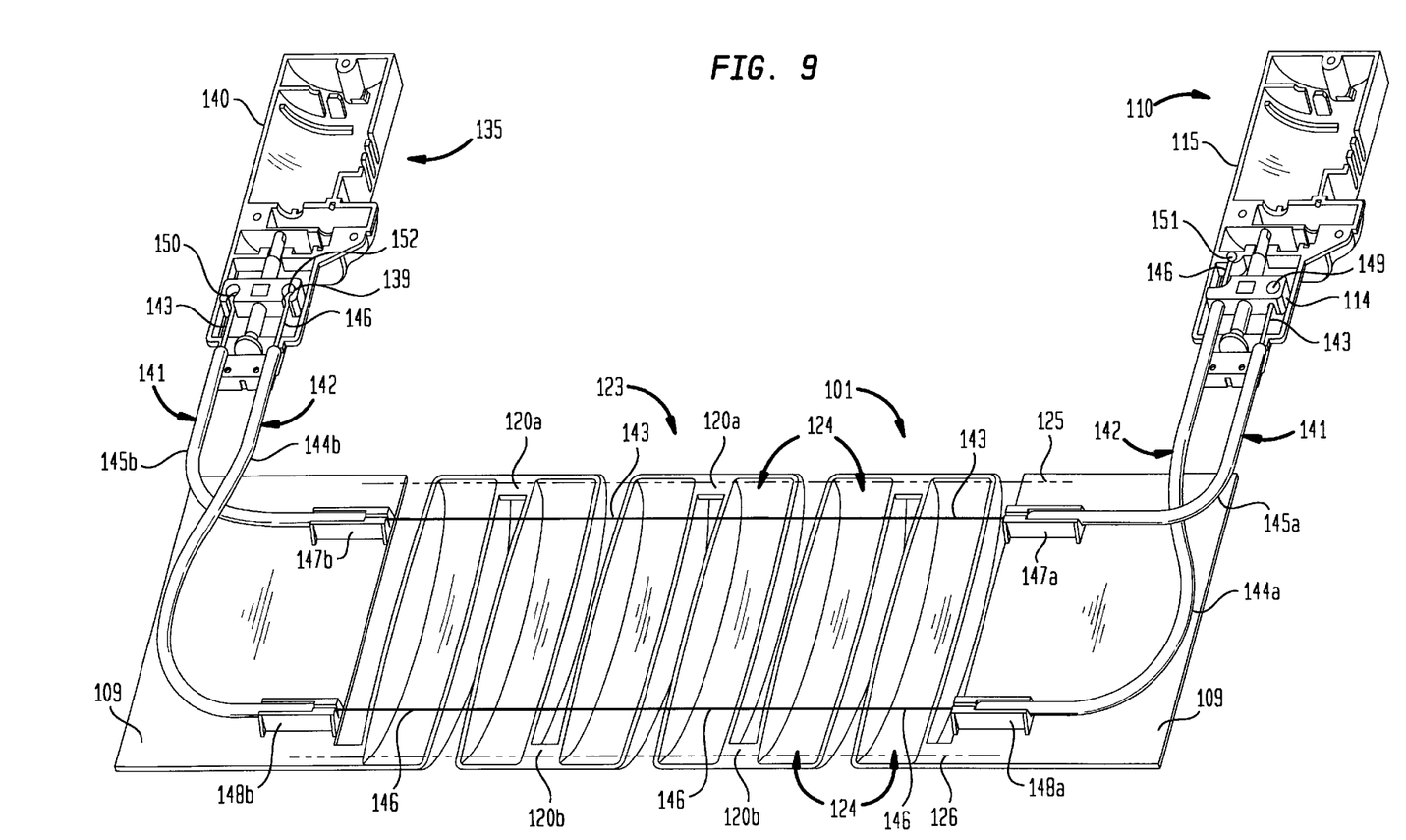
FIG. 9 is a view similar to FIG. 1 but showing another embodiment of the invention.

FIG. 9 shows a modified form of the lumbar support, and components of that embodiment which correspond to components of the embodiment previously described have been given like reference numerals except that they are in the number series 100 to 199.

In the FIG. 9 arrangement, the intermediate portion 123 is made-up of a number of interconnected profiled segments 124 as in the previous embodiment, except that the connection between adjacent segments 124 alternates from one region to another. That is, in the upper region 125 there is a connecting web 120a between each alternate pair of segments 124, and in the lower region 126 there is a connecting web 120b between each of a different pair of segments 124. The connecting webs 120 therefore alternate between the upper and lower regions 125 and 126.

The drive connection for adjusting the lumbar support of FIG. 9 includes two actuators 110 and 135 which are connected to each other and to the band 101 through two cables 141 and 142. The cable 141 includes a tubular cover 145 which is composed of two separate parts 145a and 145b, and a wire core 143 which is slidable longitudinally within the cover 145. The cable 142 includes a tubular cover 144 which is composed of two parts 144a and 144b, and a wire core 146 which is slidable longitudinally within the cover 144. Each of the actuators 110 and 135 includes a shuttle 114 and 129 respectively to which the cables 141 and 142 are connected, and also includes a drive motor 111 and 136 respectively (not shown in FIG. 9) which is operable to drive the respective shuttle 114 and 139 in either of two directions.

It is a feature of the construction shown in FIG. 9 that the cables 141 and 142 are connected to the shuttles 114 and 139 in a different way. The ends 149 and 150 of the cable 141, and the ends 151 and 152 of the cable 142, are enlarged in a known manner so as to provide a suitable connection with a component such as a shuttle. In the particular arrangement shown, each of the cable ends 149 and 150 is connected to a respective one of the shuttles 114 and 139. The cable end 152 is also connected to one of the shuttles, being the shuttle 139, whereas the cable end 151 is connected to a part of the shuttle housing 115 which is fixed relative to the shuttle 114. Also, the cable cover parts 144b and 145b are captured between the shuttle housing 140 and abutments 148b and 147b respectively which are located on one of the band end portions 109. The cable cover part 145a is captured between the shuttle housing 115 and an abutment 147a on the other band end portion 109, whereas the cable cover part 144a is captured between the shuttle 114 and an abutment 148 on that other band end portion 109.

The cable arrangement as described above has the advantage that the actuator 110 is operative to adjust the relative effective lengths of the band portions 125 and 126, whereas the actuator 135 is operative to adjust the effective length in general of the band 101. Each actuator, when inoperative, provides a relatively fixed connection for the other operative actuator through the cable arrangement described.

When the actuator 110 is operated to move the shuttle 114 towards the abutments 147a and 148a, the exposed length of cable core 146 adjacent the cable end 151 is lengthened, whereas the exposed length of the cable core 143 adjacent the cable end 149 is shortened. Since there is no change in the position of the shuttle 139 within its housing 140, the aforementioned change in the exposed length of the cable cores 146 and 143 results in the two band abutments 148a and 148b being moved towards one another, while the two band abutments 147a and 147b are permitted to move further apart. The resulting variation in the relative effective lengths of the band portions 125 and 126 causes a downward shift in the location of the zone of primary support. Reverse movement of the shuttle 114 will have the opposite effect.

When the actuator 135 is operated, the abutments 147b and 148b are both caused, or permitted, to move away from or towards the abutments 147a and 148a. The direction of movement will depend upon whether the motor 136 is operated in the forward or the reverse mode. The consequence of such relative movement of the abutments is that the general effective length of the band 101 is adjusted. That is, the degree of rearward curvature of the zone of primary support is reduced or increased.

Figure 10:
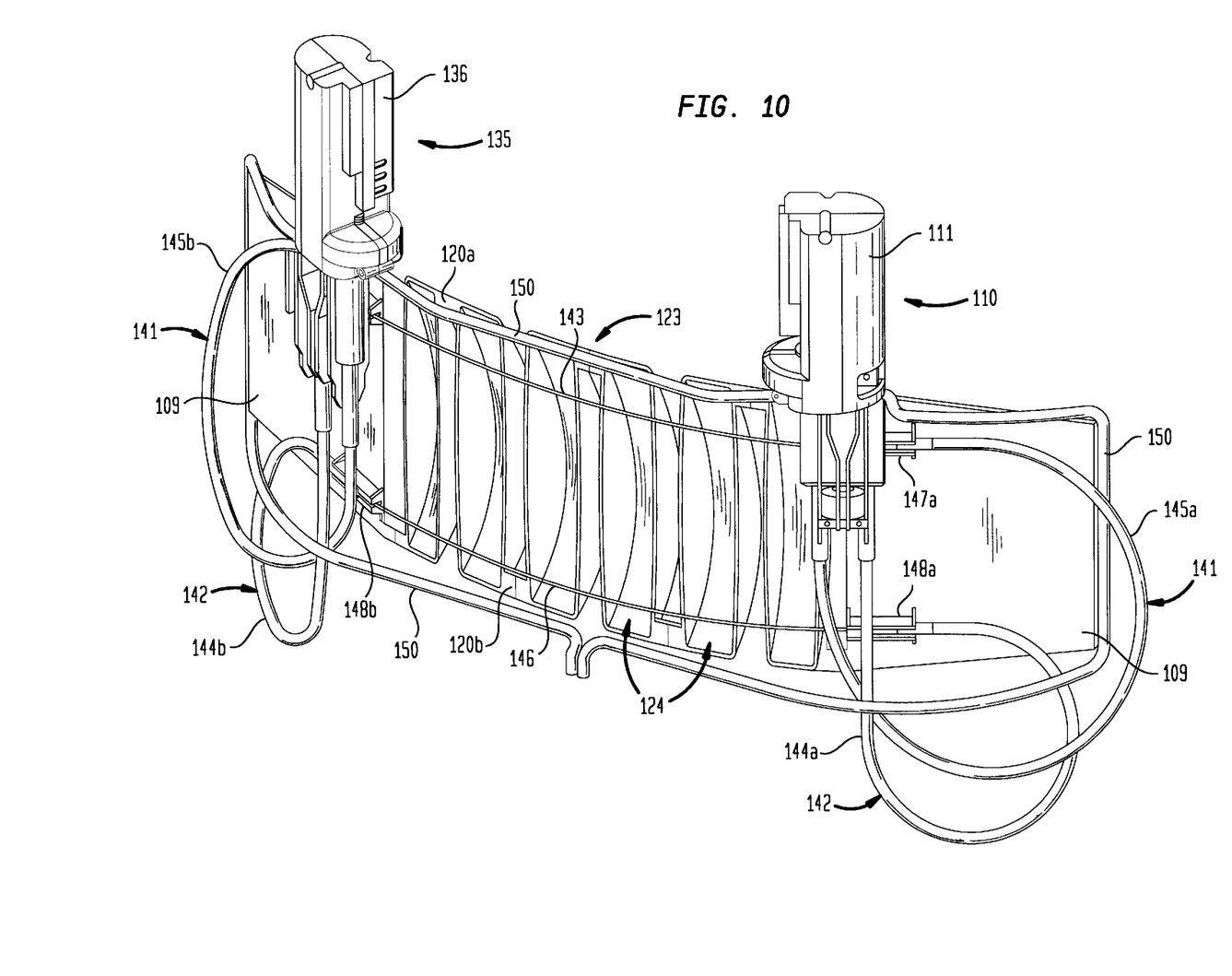
FIG. 10 shows the lumbar support of FIG. 9 mounted on a wire frame.
Figure 11:
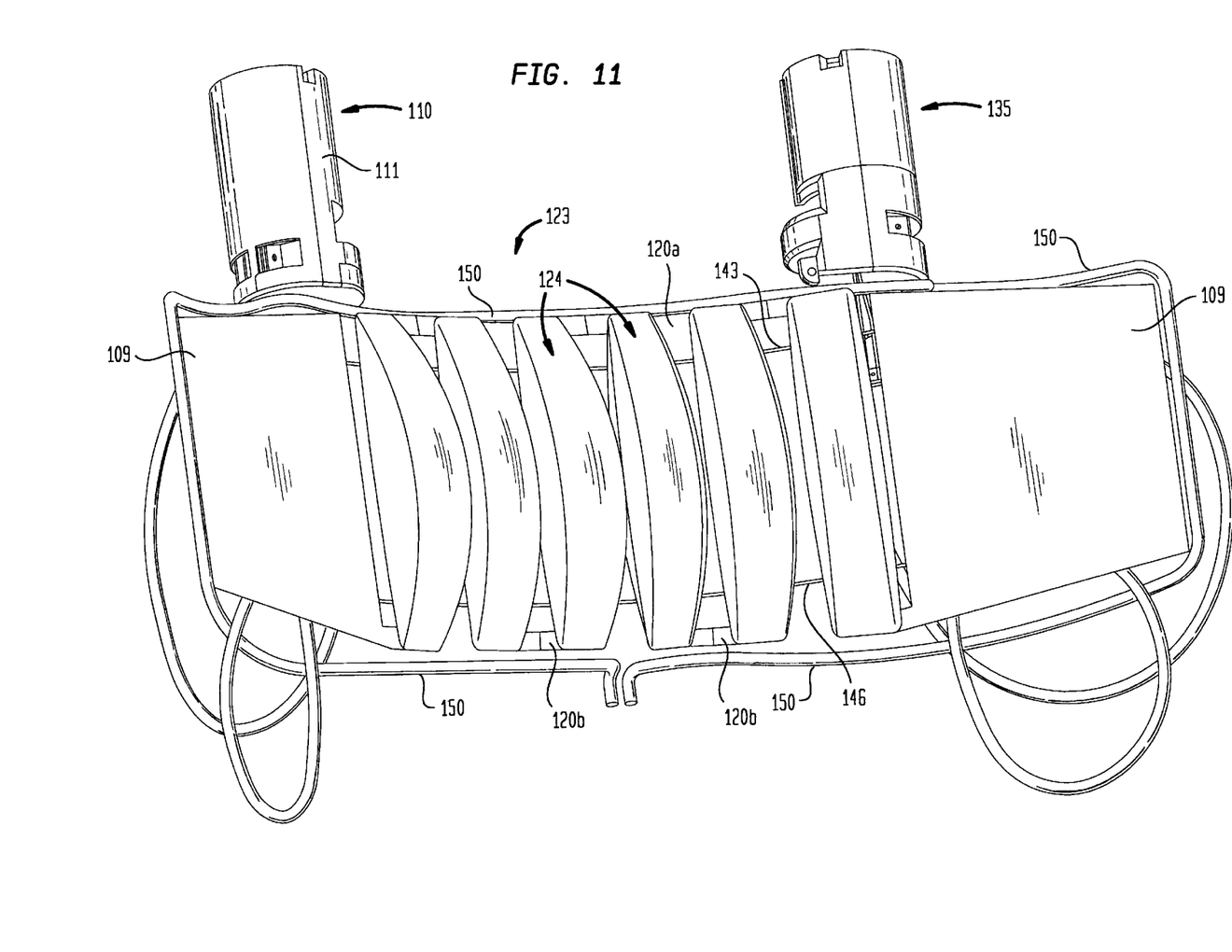
FIG. 11 is a view similar to FIG. 10 but showing the lumbar support from the front.

FIGS. 10 and 11 show the FIG. 9 arrangement mounted on a flexible wire or metal rod frame 150. The same frame, or a similar frame, could be used with any previously described embodiment. The frame 150 can serve two functions. It can assist to retain the band assembly as a unit during storage and/or transport so as to permit convenient attachment of that assembly to a seat frame. The frame 150 can also function as biasing means to impose a force on the band 101 such as to tend to move the band 101 to a condition of minimum rearward curvature. If desired, the bias could be in the reverse direction.

Figure 12:
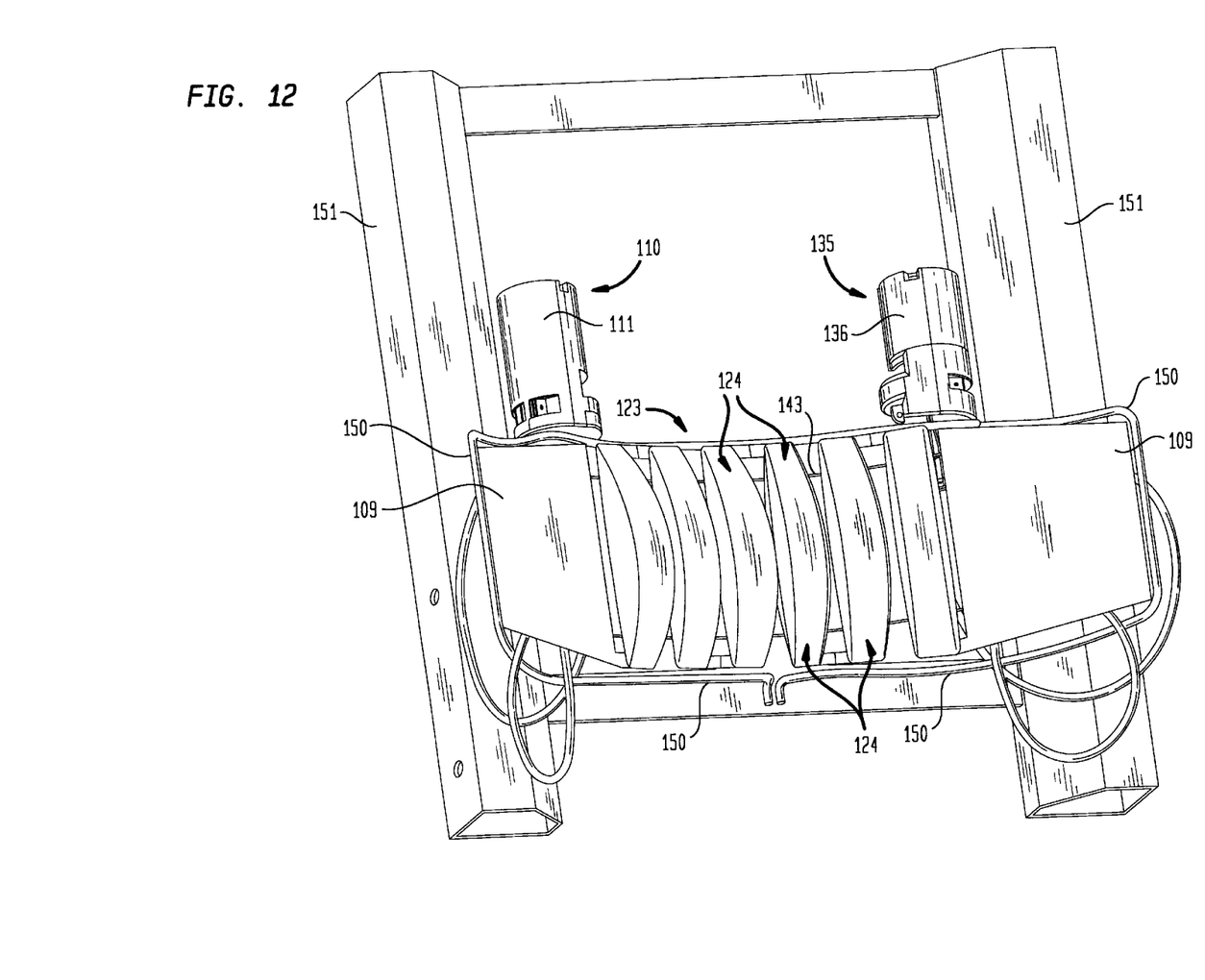
FIG. 12 is a view similar to FIG. 11 but showing the lumbar support mounted on a seat backrest frame.

FIG. 12 shows the assembly of FIG. 10 mounted on a seat frame 151, and that mounting can be arranged in any suitable fashion.

The invention, in any one of its forms, is not limited to use of electrically operated actuators as described. A mechanical or hand operated actuator could be employed for either or both of the band adjustments described. That is, the fore and aft adjustment of the overall effective length of the band, and the up and down adjustment of the location of the zone of primary support.

Also, the mechanism which transfers drive to the band drive connections need not be as shown and described.

Either one of those mechanisms could include a spindle having two threaded sections of different hand with a respective carriage mounted on each section.

A lumbar support according to the invention has the advantage of permitting relatively easy and wide range up and down adjustment of the primary support zone. That adjustment can be effected independent of fore and aft adjustment of the lumbar support. Also, a lumbar support according to the invention enables positive control to be imposed at both the upper and lower extremities of the support band, thereby adding to user comfort.

Various alterations, modifications and/or additions may be introduced into the constructions and arrangements of parts previously described without departing from the spirit or ambit of the invention as defined by the appended claims.

I claim:

1. An adjustable lumbar support for use in a seat backrest, including a flexible band which in use extends longitudinally across said backrest so that opposite ends of the band are adjacent respective opposite sides of the backrest, said band having an upper region and a lower region which extend in the longitudinal direction of the band and are laterally spaced from one another, each of said region having an effective length in said longitudinal direction which, in use, determines its depth of rearward curvature, and region adjusting means connected to both said upper and lower regions and being operative to decrease the effective length of either one of said regions while simultaneously causing or permitting an increase in the effective length of the other of said regions.

2. An adjustable lumbar support according to claim 1, wherein said region adjusting means includes an actuator and two separate drive connections each of which connects the actuator to a respective one of said regions.

3. An adjustable lumbar support according to claim 2, wherein each said drive connection is a flexible cable having a tubular outer cover and a core which is located within said cover and is slidable longitudinally relative to the cover.

4. An adjustable lumbar support according to claim 3, wherein said two drive connections of the region adjusting means are connected to the actuator of the general adjusting means in a manner such that operation of said actuator causes an increase in longitudinal tension in the core of one of said drive connections while simultaneously causing a reduction in longitudinal tension in the core of the other of said drive connections.

5. An adjustable lumbar support according to claim 2, wherein each of said drive connections connects with an end portion of a respective one of said regions, and said end portions of the two said regions are located adjacent to one another.

6. An adjustable lumbar support according to claim 2, including general adjusting means which is operative to cause simultaneous reduction of the effective length of both said regions, or to cause or allow simultaneous extension of the effective length of both said regions.

7. An adjustable lumbar support according to claim 6, wherein said general adjusting means includes an actuator and two separate drive connections each of which connects said actuator to said band.

8. An adjustable lumbar support according to any one of claim 1, wherein each said actuator is a reversible electric motor.

9. An adjustable lumbar support according to claim 2, including mounting means at each of said opposite ends of the band for mounting said band on said seat backrest, and connecting means connecting each said mounting means to the respective said band end so as to permit relative movement between the mounting means and the band.

10. An adjustable lumbar support according to claim 9, wherein said connecting means is a slide connection permitting said band to move in the longitudinal direction thereof relative to the respective said mounting means.

11. An adjustable lumbar support according to claim 10, wherein each said drive connection of the region adjusting means interacts between one of said mounting means and said band so as to be operative to cause or permit said relative movement between the mounting means and the band.

12. An adjustable lumbar support according to claim 10, including general adjusting means which is operative to cause simultaneous reduction of the effective length of both said regions, or to cause or allow simultaneous extension of the effective length of both said regions, and each said drive connection of the general adjusting means interacts between said mounting means and said band so as to be operative to cause or permit said relative movement between the mounting means and the band.

13. An adjustable lumbar support according to claim 7, wherein each of said drive connections of the general adjusting means is connected to a respective opposite end portion of said band.

14. An adjustable lumbar support according to claim 7, wherein said two drive connections of the general adjusting means are connected to one end of said band.

15. An adjustable lumbar support according to claim 14 wherein said one end of the band is located remote from end portions of said regions to which said region adjusting means is connected.

16. An adjustable lumbar support according to claim 7, wherein each said drive connection is a flexible cable having a tubular outer cover and a core which is located within said cover and is slideable longitudinally relative to the cover, said two drive connections of the general adjusting means are connected to the actuator of the general adjusting means in a manner such that operation of said actuator causes a simultaneous increase in longitudinal tension in the core of each of said drive connections, or causes a simultaneous reduction in longitudinal tension in the core of each of said drive connections.

17. An adjustable lumbar support according to claim 9, wherein said connecting means is a flexible web located adjacent one of said regions and which provides a hinge-like connection between said mounting means and a respective one of said band ends.

18. An adjustable lumbar support according to claim 1, wherein a profile forms at least part of a front surface of said band and extends between said regions, and said profile tilts backwards or forwards in response to a change in the respective said effective lengths of the two said regions.

19. An adjustable lumbar support according to claim 18, wherein said profile includes a plurality of segments each of which extends between said regions, and said segments are spaced apart in the longitudinal direction of said band.

20. An adjustable lumbar support according to claim 19, wherein each of said segments has two opposite ends each of which is adjacent a respective one of said regions, an outer surface of each of said segment has a high point which is disposed between the ends of the segment, said outer surface being a surface of the segment which faces towards the front of said backrest when said band is in use, and said high point is located further forward of a vertical plane containing the longitudinal axis of each of said regions than is any other point on the outer surface.

21. An adjustable lumbar support according to claim 19, wherein each two of said segments which are adjacent to one another are interconnected by interconnecting means which enable said spacing between said adjacent segments to be varied at least at one of said regions.

22. An adjustable lumbar support according to claim 21, wherein each said interconnecting means includes a flexible web positioned approximately midway between said regions.

23. An adjustable lumbar support according to claim 21, wherein each said interconnecting means includes a flexible web positioned adjacent one of said regions, at least one said web is positioned adjacent said upper region, and at least one other said web is positioned adjacent said lower region.

24. An adjustable lumbar support according to claim 23, wherein said flexible webs are alternately located adjacent said upper and lower regions respectively.

25. An adjustable lumbar support for use in the backrest of a seat, including a flexible band which in use extends longitudinally across a said backrest so that opposite ends of the band are adjacent respective opposite sides of the backrest, said band having an upper region and a lower region which extend in the longitudinal direction of the band and are laterally spaced from one another, each said region having an effective length in said longitudinal direction which in use determines a depth of rearward curvature of the respective said region, a plurality of segments forming at least part of said band and being spaced apart in the longitudinal direction of the band, each of said segments extending between said upper and lower regions, means interconnecting each two of said segments which are adjacent to one another and permitting relative movement between said adjacent segments such that the spacing between at least one pair of said adjacent segments increases at one of said regions and the spacing between at least one pair of said adjacent segments decreases at the other of said regions simultaneous with said increase in spacing.

26. An adjustable lumbar support according to claim 25, wherein said increase and decrease in said spacing occurs between the same said pair of adjacent segments.

27. An adjustable lumbar support according to claim 25, wherein said increase and decrease in spacing occurs between different ones of said pairs of segments.

28. An adjustable lumbar support according to claim 1 wherein said band is mounted on a resilient frame which biases said band towards a position at which rearward curvature of said band is at a predetermined minimum.

29. An adjustable lumbar support for use in the backrest of a seat, including a flexible band which in use extends longitudinally across a said backrest so that opposite ends of the band are adjacent respective opposite sides of the backrest, said band having an upper region and a lower region which extend in the longitudinal direction of the band and are laterally spaced from one another, each said region having an effective length in said longitudinal direction which in use determines a depth of rearward curvature of the respective said region, and a resilient frame connected to said band and being operative to bias said band towards a position at which the rearward curvature of the band is at a predetermined minimum or maximum.

30. An adjustable lumbar support according to claim 29, including region adjusting means connected to both said upper and lower regions and being operative to decrease the effective length of either one of said regions while simultaneously causing or permitting an increase in the effective length of the other said region.

31. An adjustable lumbar support according to claim 30, including general adjusting means which is operative to cause simultaneous reduction of the effective length of both said regions, or to cause or allow simultaneous extension of the effective length of both said regions.

32. A seat assembly including a seat backrest frame having two laterally spaced side members, an adjustable lumbar support according to claim 1 extending between said side members, and means attaching each of two opposite ends of said lumbar support to a respective one of said side members.

33. A seat assembly according to claim 32, wherein said attaching means includes mounting means at each of said opposite ends of the band for mounting said band on said seat backrest frame.

* * * * *

UNITED STATES PATENT AND TRADEMARK OFFICE
CERTIFICATE OF CORRECTION

PATENT NO. : 5,769,490
DATED : June 23, 1998
INVENTOR(S) : Falzon

It is certified that error appears in the above-identified patent and that said Letters Patent is hereby corrected as shown below:

Column 9, line 23, "region" should read --regions--.

Column 9, lines 62, 62, "to any one of claim 1" should read --to claim 7--.

Signed and Sealed this

Twenty-seventh Day of October, 1998

Attest:

BRUCE LEHMAN

Attesting Officer

Commissioner of Patents and Trademarks